Dec. 18, 1928.  1,695,837
J. M. ANDREWS
BOX BOARD OR CADDY STOCK
Filed Aug. 24, 1923
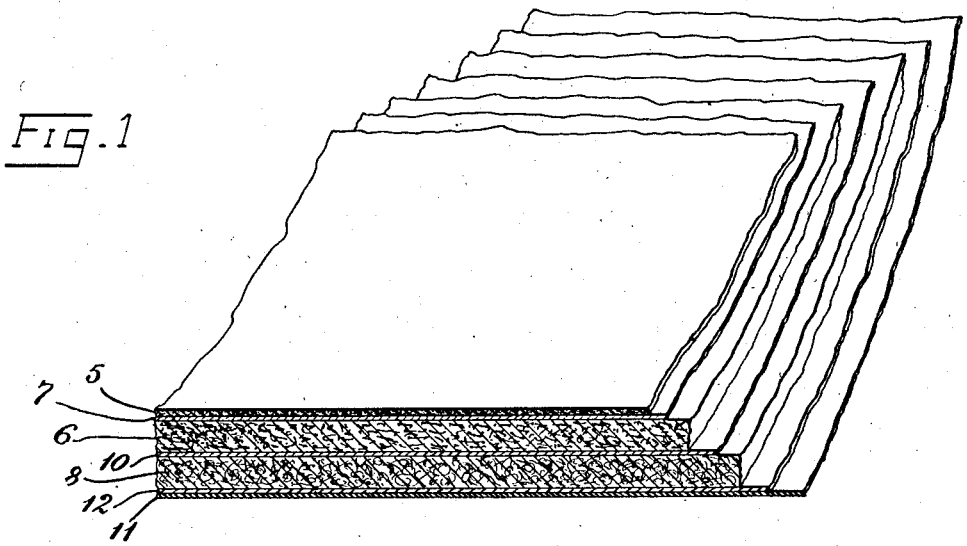
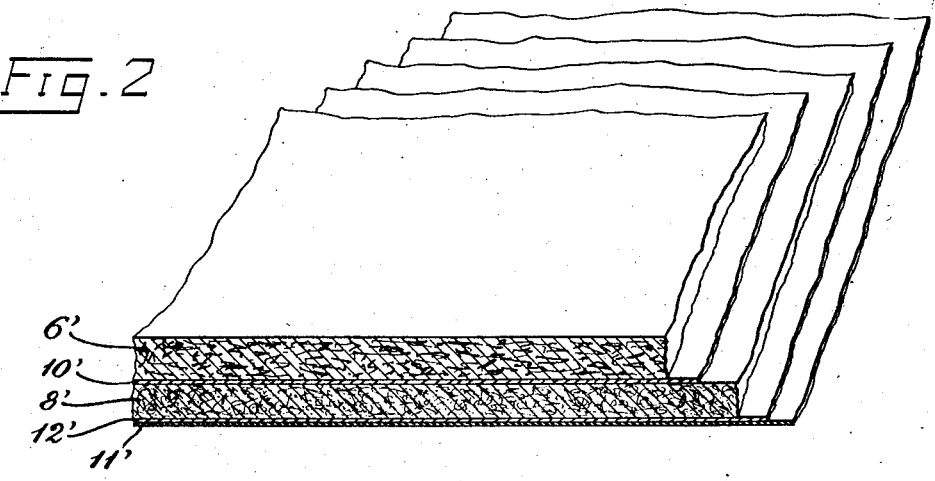
Witnesses:
Inventor:
James M. Andrews
By his Att'y Patented Dec. 18, 1928.

1,695,837

UNITED STATES PATENT OFFICE.

JAMES M. ANDREWS, OF BROOKLYN, NEW YORK, ASSIGNOR TO ROBERT GAIR COMPANY, OF NEW YORK, N. Y., A CORPORATION OF NEW YORK.

BOX-BOARD OR CADDY STOCK.

Application filed August 24, 1923. Serial No. 659,179.

This invention relates to box-board or stock for food containers, caddies or the like, though it is noted that the invention is not limited to food containers nor in some respects to container stock.

One object of the invention is to provide a stock of this kind which is inodorous, moisture and grease proof and suitable for the manufacture of food caddies or containers.

Another object of the invention is to provide a stock of this kind which is of attractive interior and exterior appearance, which has good bending power and is resistant to rough treatment.

Another object of the invention is to provide a stock of this kind which will retain its shape when made up, and which will provide a container of sanitary and appetizing interior.

Other objects of the invention are to improve generally the simplicity and efficiency of such stock or board and to provide a board of this kind which is durable, economical to manufacture and handle, and which will not have the various objections of the stocks previously on the market.

The inventive features for the accomplishment of these and other objects are disclosed herein in connection with an improved stock or board which, briefly stated, comprises an outer portion of kraft or chip or other material of attractive appearance and a suitable body to which is cemented by silicate of soda a layer of news having a lining of Japanin secured to the news by flour paste.

Other objects of the invention will appear as the description proceeds; and while herein details of the invention are described, the invention is not limited to these, since many and various changes may be made without departing from the scope of the invention as claimed.

In the accompanying drawing, showing by way of example, two of many possible embodiments of the invention, Figs. 1 and 2 are much enlarged fragmental perspective views partly in section respectively showing the two forms of my invention.

As shown in Fig. 1 my improved form of inodorous, grease and moisture proof box board or stock for food-preserving containers and other purposes, comprises an outer layer 5 of kraft for giving attractive appearance, strength and bending power to the stock, resisting punctures, abrasion and other rough treatment, and forming an attractive back ground for printing copy. Next comes a layer of laminated chip 6 of suitable caliper cemented by silicate of soda 7 to the kraft, for giving the desired bulk and caliper to the stock in accordance with the caliper of the chip used. A layer 8 of smooth, even, bluish gray news is cemented by silicate of soda 10 to the chip 6 for hiding the unavoidable yellowish dirty color of the chip caused by the silicate.

A lining 11 of smooth, inelastic white substantially transparent or translucent light-reflecting non-absorbent grease and moisture proof Japanin or glassine is secured to the news by white flour paste 12, for rendering the interior of the container sanitary, keeping food fresh and transmitting and reflecting the color of the news and paste and reflecting exterior light to give to the interior of the container a bright sanitary appearance and for keeping it sanitary. Said lining being inelastic also prevents the stock from stretching, thus holding the container in shape.

Fig. 2 shows a similar grease and moisture proof stock comprising instead of the kraft an outer layer of mist gray chip 6' for giving an unusual and attractive appearance and bulk to the stock, to which is secured by silicate of soda 10', a layer of news 8'. A lining of Japanin 11' is secured to the news 8' by white flour paste 12' as described of Fig. 1.

While the invention is in no way limited to the thickness of the various elements of the stock, the following calipers in fractions of inches are given as examples.

For the stock of Fig. 1:

| | |
|---|---|
| Kraft | .005 |
| Chip | .018 |
| News | .018 |
| Japanin | .002 |
| Total adhesives | .004 |
| Thickness of stock | .047 |

For the stock of Fig. 2:

| | |
|---|---|
| Mist gray chip | .023 |
| News | .018 |
| Japanin | .002 |
| Total adhesives | .004 |
| Thickness of stock | .047 |

My improved stocks are economical to manufacture, inodorous, and grease and moisture proof. The outer face is of attractive appearance, and the board has strength and bending power for resisting punctures, abrasion and other rough treatment. The silicate of soda is fast setting and easy to handle and is sanitary, and fairly grease and water proof. The interior of the stock or board is smooth to prevent the collecting of dust, and is light reflecting. The stock will not stretch and thus holds the container in shape. The interior of the containers, remains sanitary and keeps food fresh. The transmitted and reflected light of the lining gives to the interior of the container a bright sanitary appearance.

While any suitable light colored adhesive may be used for securing the Japanin to the news, I have found that a white flour paste, having a suitable gum, such as dextrine, glue, gum arabic or the like incorporated therein to increase the grip or adhesiveness of the paste, is very suitable, though the invention is not so limited. The amount of gum included is variable depending upon the speed of application.

The term Japanin designates a thoroughly hydrated, super calendered sulphate or sulphite paper having grease proof and transparent qualities.

I claim as my invention:

1. A stock for containers comprising a body layer of chip; a layer of news cemented by silicate of soda to the chip; and a translucent lining secured to the news by flour paste.

2. A stock for containers comprising a layer of chip; a layer of news secured to the chip; and a moisture and grease-proof lining secured to the news.

3. In a stock for containers, in combination, a layer of kraft, a layer of chip cemented to the layer of kraft by silicate of soda, a layer of news cemented to the layer of chip by silicate of soda, and a lining of hydrated highly calendered inelastic paper secured to the layer of news by flour paste having gum therein.

4. In a stock for containers, in combination, a body layer of chip, a layer of news cemented to the layer of chip by silicate of soda, and a translucent moisture and grease-proof lining secured to the layer of news by flour paste.

5. In a stock for containers, in combination, a layer of chip, a layer of bluish news cemented to the layer of chip by silicate of soda, and a lining of hydrated highly calendered inelastic grease and moisture proof paper secured to the layer of news.

6. In a stock for containers, in combination, a layer of chip, a layer of news secured to the layer of chip, hydrated highly calendered inelastic paper having translucent and grease and moisture proof qualities for providing a lining, and flour paste for securing said lining to the news.

7. In the process of making paper board stock for containers having translucent lining, the step of concealing discoloration defects in the base material, which consists in interposing a layer of news between the lining and the base material.

JAMES M. ANDREWS.